Figure 1:
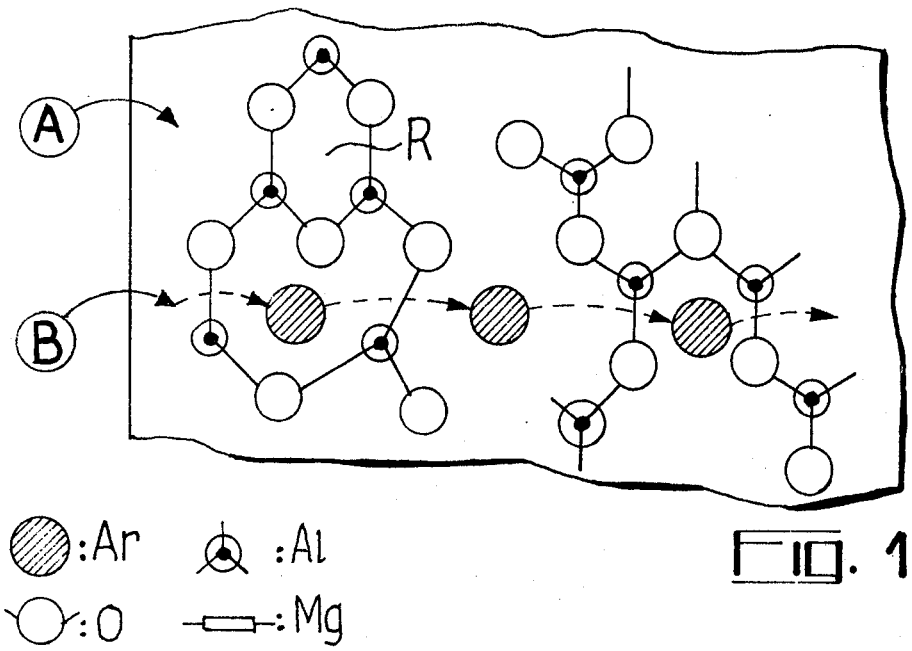

United States Patent [19]
Croset et al.

[11] 4,085,048
[45] Apr. 18, 1978

[54] DEVICE FOR SEPARATING FLUIDS AND A METHOD OF MANUFACTURING IT

[75] Inventors: Michel Croset; Gonzalo Velasco, both of Paris, France

[73] Assignee: Thomson-CSF, Paris, France

[21] Appl. No.: 696,427

[22] Filed: Jun. 15, 1976

Related U.S. Application Data

[63] Continuation of Ser. No. 453,156, Mar. 20, 1974, abandoned.

[30] Foreign Application Priority Data

Mar. 23, 1973 France .................................. 73.10562

[51] Int. Cl.² ........................ B01D 53/22; B01D 13/00
[52] U.S. Cl. ................................... 210/321 R; 55/158; 210/500 M
[58] Field of Search ............................. 55/16, 158, 66; 210/31 C, 31 A, 198 C, 321 R, 500 M

[56] References Cited

U.S. PATENT DOCUMENTS

| | | | |
|---|---|---|---|
| 2,980,532 | 4/1961 | Martensson et al. | 55/16 X |
| 3,502,217 | 3/1970 | Bauckner | 210/198 C |
| 3,678,654 | 7/1972 | Low et al. | 55/16 |

*Primary Examiner*—John Adee
*Attorney, Agent, or Firm*—Cushman, Darby & Cushman

[57] ABSTRACT

The device is based on the use of amorphous thin layers having a thickness of the order of 1000 Angstrom units and a cellular structure on the same scale as the distances between atoms, the structure being homogeneous and isotropic inside the layer. The structure is made of substances which are physically and chemically inert towards the substances to be separated. The cellular structure is due to the incorporation in the layer of elementary particles acting as network dilators or network modifiers.

11 Claims, 7 Drawing Figures

●: Ar  ⊛: Al
○: O   ▭: Mg

DEVICE FOR SEPARATING FLUIDS AND A METHOD OF MANUFACTURING IT

This is a continuation of application Ser. No. 453,156 filed Mar. 20, 1974, now abandoned.

It is known to separate the constituents of a mixture of fluids having molecular or atomic weights very close to each other by using porous walls through which the mixture is caused to pass.

The substance having the lower atomic weight travels through the walls more easily, thus giving a separating effect, i.e. a mixture enriched in one of the constituents. As is known, installations based on this principle have an efficiency which is limited by the nature of the phenomenon and is very much lower than the theoretical value, owing to disturbing influences.

The invention relates to a device for separating the constituents of a fluid mixture, which eliminates the interfering influences and the efficiency of which is much nearer the theoretical value.

The device according to the invention for separating mixtures of fluids comprises thin non-porous layers which fulfil the following conditions:
  a. they are physically and chemically inert towards the substances to be separated;
  b. they have an amorphous structure;
  c. they have an alveolar or cellular structure with cells on the scale as the distances between atoms, this latter structure being homogeneous and isotropic inside the layer;
  d. they enable the species to be separated to move from one cell to another by successive jumps, the jumps obeying the laws of diffusion or migration without any chemical bonds occurring between the moving substances and the network of the layer; and
  e. their alveolar or cellular structure is caused by the incorporation of elementary or complex particles in the layer.

In a first embodiment of the invention, the particles are of the network modifier kind.

In a second embodiment, the particles are of the network dilator kind.

In the rest of the description, the term "network dilator" means any element which is not chemically bonded to the network and which dilates the meshes when incorporated in the interstices of the network. The term "network modifier" denotes any compound which is bonded to the network matrix and locally perturbs its atomic structure.

The transparency of the aforementioned thin layers with respect to the substances to be separated depends on the topological structure of the layers, i.e. on their content of perturbing substances (dilators or modifiers) and the nature of such substances.

According to the invention, this property is used to adjust the selectivity of separation to the nature of the substances to be separated.

Figure 5:
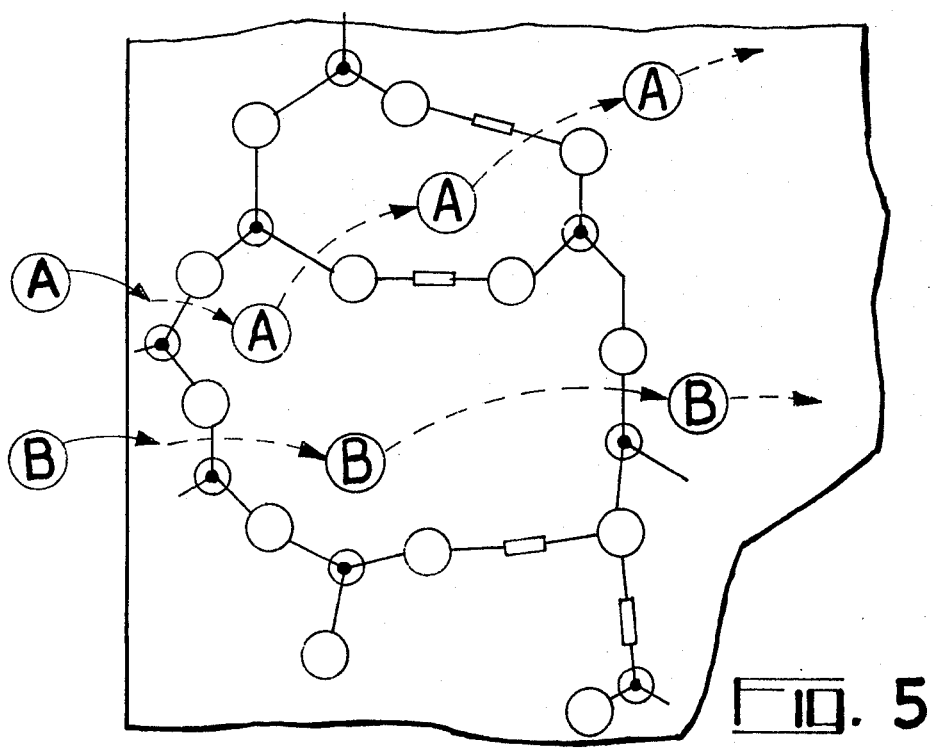
Figure 3:
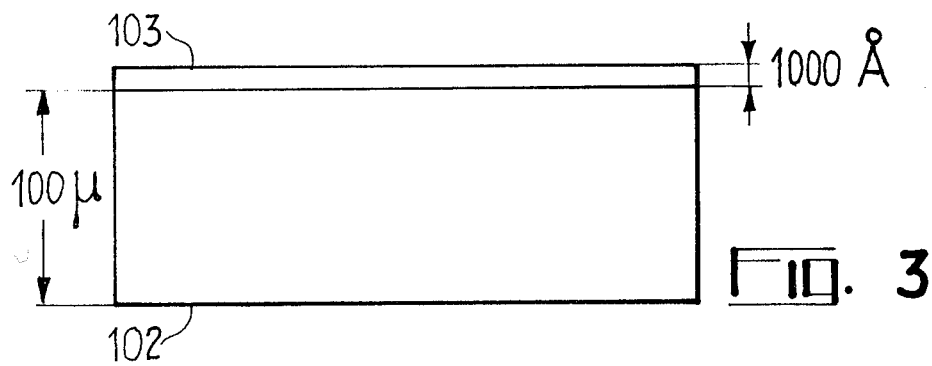
Figure 2:
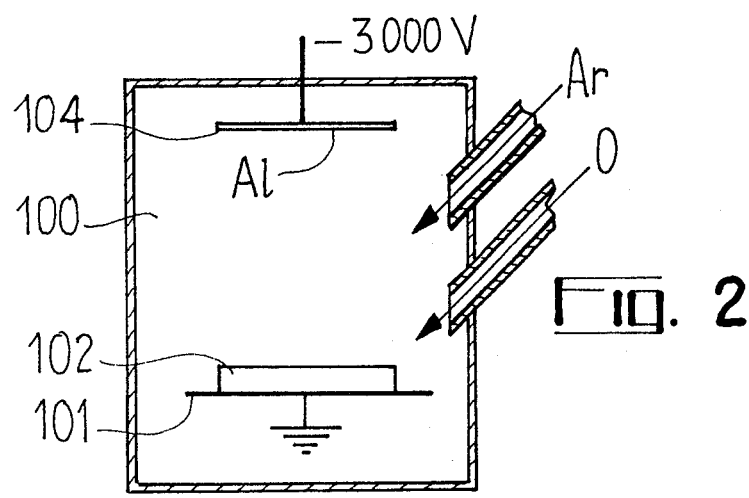
Figure 4:
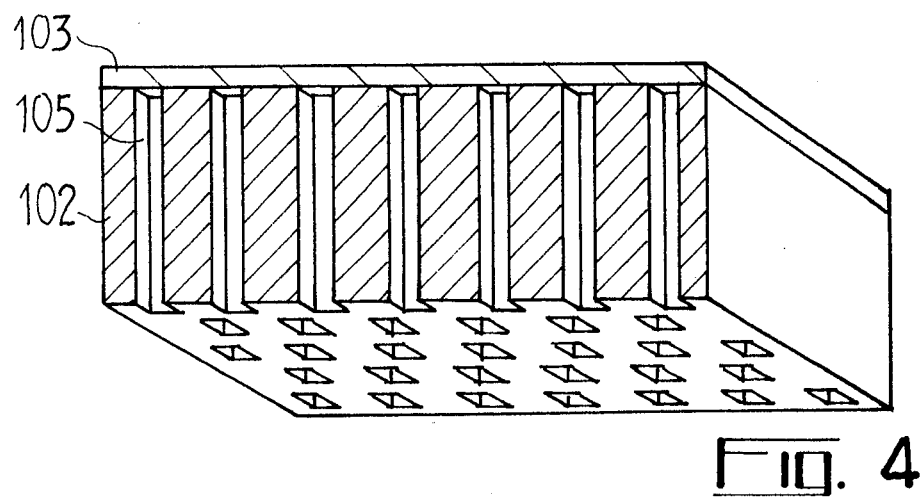
Figure 6:
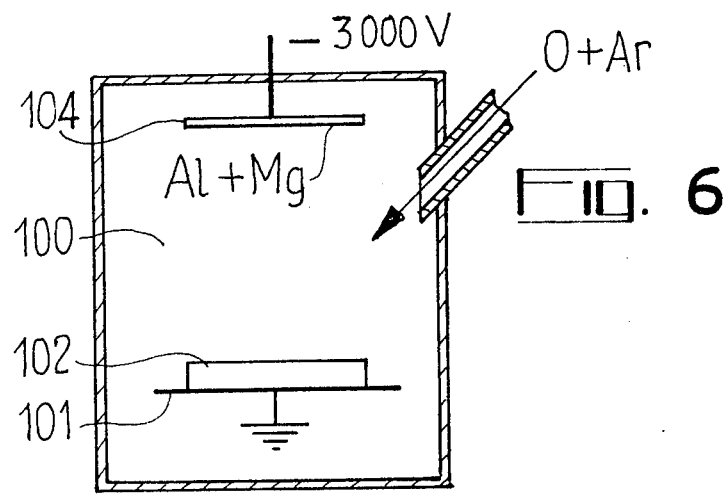
Figure 7:
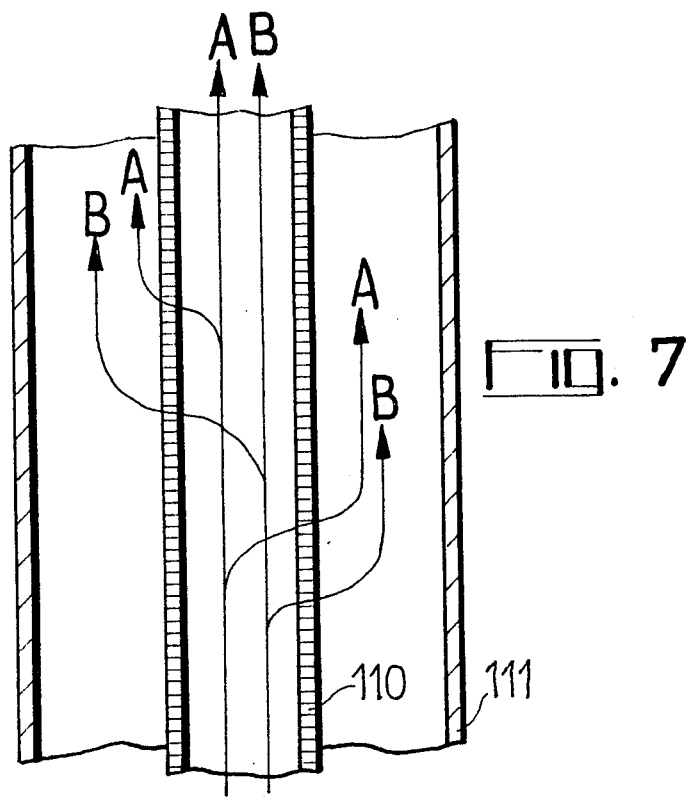

The invention will be more clearly understood from the following description with reference to the accompanying drawings in which:

FIG. 1 diagrammatically shows the atomic structure of a thin layer of the "network dilator kind", FIGS. 2, 3 and 4 show the method of manufacturing the layer of FIG. 1;

FIG. 5 shows the structure of a layer after elementary particles of the network-modifier kind have been incorporated therein, FIG. 6 diagrammatically shows a cathode sputtering device for manufacturing the layer in FIG. 5, and FIG. 7 shows, in cross-section, an embodiment of a unit in a fluid-separating system using devices according to the invention.

By way of non-limitative example, FIG. 1 shows the structure of an alumina layer made vitreous by introducing a foreign substance which, when inserted into the network, prevents the formation of regular meshes or cells. In the present case, the foreign substance consists of argon atoms.

The aluminium ion has three bonds, each joined to an oxygen ion. The argon locally perturbs the compact texture of the network shown e.g. at R.

The other bonds form irregular connections, producing meshes into which argon particles are introduced.

The layer has a thickness of the order of 1000 Angstrom units.

If there is a difference in the argon concentration between the two media in which the two sides of the layer are immersed, a transfer of argon particles occurs by jumps from one mesh to another, in accordance with the laws of thermal diffusion from the more concentrated medium towards the less concentrated medium. If a mixture of two gases A and B of different atomic weights is placed on the side immersed in the medium at a higher pressure, the elementary particles of the substances penetrate into the meshes of the network in the spaces left free by the argon atoms. The transfer speed will depend on their respective atomic weights. On the opposite surface, a mixture enriched in the substance having the lower atomic weight can be collected after a time T. We thus have the basic features of a system for separating the isotopes of a gas, wherein separation is based entirely on transfer by short jumps and not on travel through microscopic pores of a thin wall as in known devices, in which the separation is accompanied by travel, without separation, of the constituents of the mixture in the central part of the wall, so that the efficiency is less than the theoretical efficiency.

The remaining figures show steps in the manufacture of a layer comprising particles of the "network dilator" kind. A substrate 102, made e.g. of silicon, on which a layer is to be deposited is deposited on an anode 101 connected to earth in a reactive cathode sputtering chamber 100 (FIG. 2). In an embodiment of the invention, the thickness of substrate 102 is of the order of 100 microns or more. An aluminium cathode 104 is disposed at the other end of the chamber. The chamber is filled with a mixture of argon and oxygen, the partial pressure of argon being of the order of 10 Torr and the partial pressure of oxygen being of the order of $10^{-4}$ Torr. A voltage of the order of $-1000$ to $-5000$V is applied to the cathode.

The result of the operation in FIG. 2 is shown in FIG. 3: the substrate 102 is covered with a layer 103 of alumina 1000 Angstrom units thick, in which argon atoms are incorporated. The layer is amorphous and has the texture shown in FIG. 1.

In the next stage, (FIG. 4) microscopic channels 105 having a diameter of the order of 1 micron are produced in the substrate by any known method, e.g. by acid etching through a mask.

The remaining drawings refer to layers having a regular structure which is perturbed by the introduction of particles of the "network modifier" kind.

The structure shown in FIG. 5 is of the "network modifier" kind. Magnesium ions have been incorporated in the layer. These ions have only two possible bonds with elementary particles of oxygen and are inert with respect to aluminum. They thus modify the network of particles. The cellular structure is not regular and, as in the preceding case, the particles in the mixture to be separated migrate by jumping from one cell to another.

The method of manufacture is essentially the same as in the preceding case. The only difference is that the reactive cathode sputtering device is modified, the cathode 104 in FIG. 6 being made of a magnesium-aluminum alloy in proportions which vary depending on the desired result.

The oxygen pressure is of the same order of magnitude as in the preceding case.

FIG. 7 is a very diagrammatic view of a unit in a fluidseparating apparatus using devices according to the invention. The apparatus comprises two hollow coaxial cylinders 110, 111. The inner cylinder 111 has surfaces having the structure shown in FIG. 4.

The fluid mixture enters the unit through the interior of cylinder 110. Migration occurs owing to a pressure difference of the order of 0.1 atm. which is applied between the inner wall and the outer wall of the inner cylinder 110.

The flow rate is sufficient for a mixture enriched in one constituent to leave through the outer duct formed by the space between the two cylinders. Such devices are well known in the art.

What I claim is:

1. A device for separating predetermined fluid species mixtures by diffusion through a plurality of thin non-porous layers disposed on porous walls, said non-porous layers fulfilling all the following conditions:
   a. they are physically and chemically inert towards the substances to be separated;
   b. they have an amorphous structure;
   c. they have a cellular structure with cells on the same scale as the distances between atoms, the structure being homogeneous and isotropic inside the layers;
   d. they enable the species to be separated to move from one cell to another by successive jumps, the jumps obeying the laws of diffusion or migration without any chemical bonds occurring between the moving substances and the inter-atomic network of the layer; and
   e. they owe their cellular structure to the incorporation of elementary or complex particles in the layer.

2. A device according to claim 1, wherein the particles are of the "network dilator" kind.

3. A device according to claim 1, wherein the elementary particles are of the "network modifier" kind.

4. A device according to claim 1, wherein said non-porous layer comprises an inter-atomic network of ions or of aluminum and oxygen.

5. A device according to claim 4, wherein said elementary particles are argon ions.

6. A device according to claim 4, wherein said elementary particles are magnesium ions.

7. A device according to claim 1, wherein said layers have a thickness of the order of 1000 Angstrom unity a substrate having pores of a diameter of the order of 1 micron, said substrate supporting said layers, said layers having a thickness of the order of 100 microns.

8. A device as claimed in claim 1, wherein said particles have no chemical bonds with said inter-atomic network, and migrate from one side to the other of said layer, this being the consequence of the difference of concentration of said particles in said media.

9. A device as claimed in claim 8, wherein said inter-atomic network is made of ions of aluminum and oxygen, said particles being argon ions.

10. A device as claimed in claim 1, wherein said particles have no chemical bonds with at least one kind of ions constituting the inter-atomic network thus preventing the formation of crystalline network.

11. A device as claimed in claim 10, wherein said inter-atomic network is made of ions of aluminum, oxygen and magnesium.

* * * * *